United States Patent
Chen

(10) Patent No.: US 11,537,458 B2
(45) Date of Patent: Dec. 27, 2022

(54) REDUCING SERVICE DISRUPTIONS IN A MICRO-SERVICE ENVIRONMENT

(71) Applicant: Red Hat, Inc., Raleigh, NC (US)

(72) Inventor: Huamin Chen, Westboro, MA (US)

(73) Assignee: Red Hat, Inc., Raleigh, NC (US)

( * ) Notice: Subject to any disclaimer, the term of this patent is extended or adjusted under 35 U.S.C. 154(b) by 267 days.

(21) Appl. No.: 16/750,539

(22) Filed: Jan. 23, 2020

(65) Prior Publication Data
US 2020/0159630 A1 May 21, 2020

Related U.S. Application Data

(63) Continuation of application No. 15/834,792, filed on Dec. 7, 2017, now Pat. No. 10,558,533.

(51) Int. Cl.
| | | |
|---|---|---|
| *G06F 11/00* | (2006.01) | |
| *G06F 11/14* | (2006.01) | |
| *G06F 9/50* | (2006.01) | |
| *G06F 11/16* | (2006.01) | |
| *G06F 9/445* | (2018.01) | |
| *G06F 11/20* | (2006.01) | |
| *G06F 8/60* | (2018.01) | |

(52) U.S. Cl.
CPC ............ *G06F 11/008* (2013.01); *G06F 9/445* (2013.01); *G06F 9/5055* (2013.01); *G06F 11/1482* (2013.01); *G06F 11/1658* (2013.01); *G06F 11/203* (2013.01); *G06F 8/60* (2013.01); *G06F 2201/805* (2013.01); *G06F 2201/82* (2013.01)

(58) Field of Classification Search
CPC .. G06F 11/008; G06F 11/203; G06F 11/3433; G06F 11/3442; G06F 9/505; G06F 9/5055; G06F 9/5083; G06F 2009/4557; G06F 11/1482; G06F 11/1484; H04L 67/1008
See application file for complete search history.

(56) References Cited

U.S. PATENT DOCUMENTS

| | | | |
|---|---|---|---|
| 6,466,980 B1 | 10/2002 | Lumelsky et al. | |
| 7,325,161 B1 * | 1/2008 | Rakic ................. | G06F 11/1458 714/15 |
| 8,087,025 B1 | 12/2011 | Graupner | |
| 8,886,804 B2 | 11/2014 | Osmond | |
| 9,559,914 B1 * | 1/2017 | Groenewald .......... | G06N 20/00 |
| 10,601,683 B1 * | 3/2020 | Kulshreshtha ...... | H04L 41/5019 |
| 2007/0156842 A1 | 7/2007 | Vermeulen et al. | |

(Continued)

OTHER PUBLICATIONS

Kubernetes, "Advanced Scheduling Kubernetes", Kubernetes, accessed on Oct. 10, 2017, 6 pages.

(Continued)

*Primary Examiner* — Bryce P Bonzo
*Assistant Examiner* — Albert Li
(74) *Attorney, Agent, or Firm* — Lowenstein Sandler LLP

(57) ABSTRACT

Aspects of the disclosure provide for reducing service disruptions in a computer system. A method of the disclosure may include identifying a plurality of services running on a node of a computer system, determining a plurality of priorities corresponding to the plurality of services, determining a plurality of service capacity factors for the plurality of services in view of the plurality of priorities, and determining a lost impact factor in view of the plurality of service capacity factors.

20 Claims, 7 Drawing Sheets

(56) References Cited

U.S. PATENT DOCUMENTS

| | | | |
|---|---|---|---|
| 2009/0048994 | A1 | 2/2009 | Applebaum et al. |
| 2009/0064156 | A1* | 3/2009 | He .................. G06F 9/5077 |
| | | | 718/104 |
| 2010/0306371 | A1 | 12/2010 | Osmond |
| 2012/0016907 | A1 | 1/2012 | Ikeda et al. |
| 2013/0305083 | A1* | 11/2013 | Machida ............ H04L 69/40 |
| | | | 714/4.1 |
| 2015/0081916 | A1* | 3/2015 | McGrath .......... G06F 9/45558 |
| | | | 709/226 |
| 2016/0162666 | A1* | 6/2016 | Casey ................ H04L 67/10 |
| | | | 726/29 |
| 2018/0365108 | A1* | 12/2018 | Johnson ........... G06F 11/0709 |

OTHER PUBLICATIONS

Microsoft, "Services Fabric Cluster Capacity Planning Considerations", Microsoft, accessed Oct. 10, 2017, 12 pages.
Kubernetes, "Disruptions—Kubernetes", Concepts, accessed Oct. 10, 2017, 10 pages.
Openstack, "OpenStack Docs—Key Compute API Concepts", Openstack, accessed Oct. 10, 2017, 5 pages.
Rocha et al., "Recent Advances in Information Systems and Technologies, vol. 2", 2 pages.
USPTO, Notice of Allowance for U.S. Appl. No. 15/834,792, dated Sep. 18, 2019.
Rocha et al., "Recent Advances in Information Systems and Technologies, Springer International Publishing, vol. 2", 2017, 7 pages.

\* cited by examiner

REDUCING SERVICE DISRUPTIONS IN A MICRO-SERVICE ENVIRONMENT

RELATED CASES

The present application is a continuation of application Ser. No. 15/834,792, filed Dec. 7, 2017, entitled "REDUCING SERVICE DISRUPTIONS IN A MICRO-SERVICE ENVIRONMENT", which is incorporated by reference herein.

TECHNICAL FIELD

The implementations of the disclosure relate generally to computer systems and, more specifically, to reducing service disruptions in a computer system (e.g., a micro-service environment).

BACKGROUND

Employing micro-services allows breaking down complex applications into relatively simple independent processes, thus producing highly decoupled systems. Each system may include multiple applications that are hosted on a provider's infrastructure. Each process associated with the services is focusing on doing a relatively simple task to support the applications for each individual costumer.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
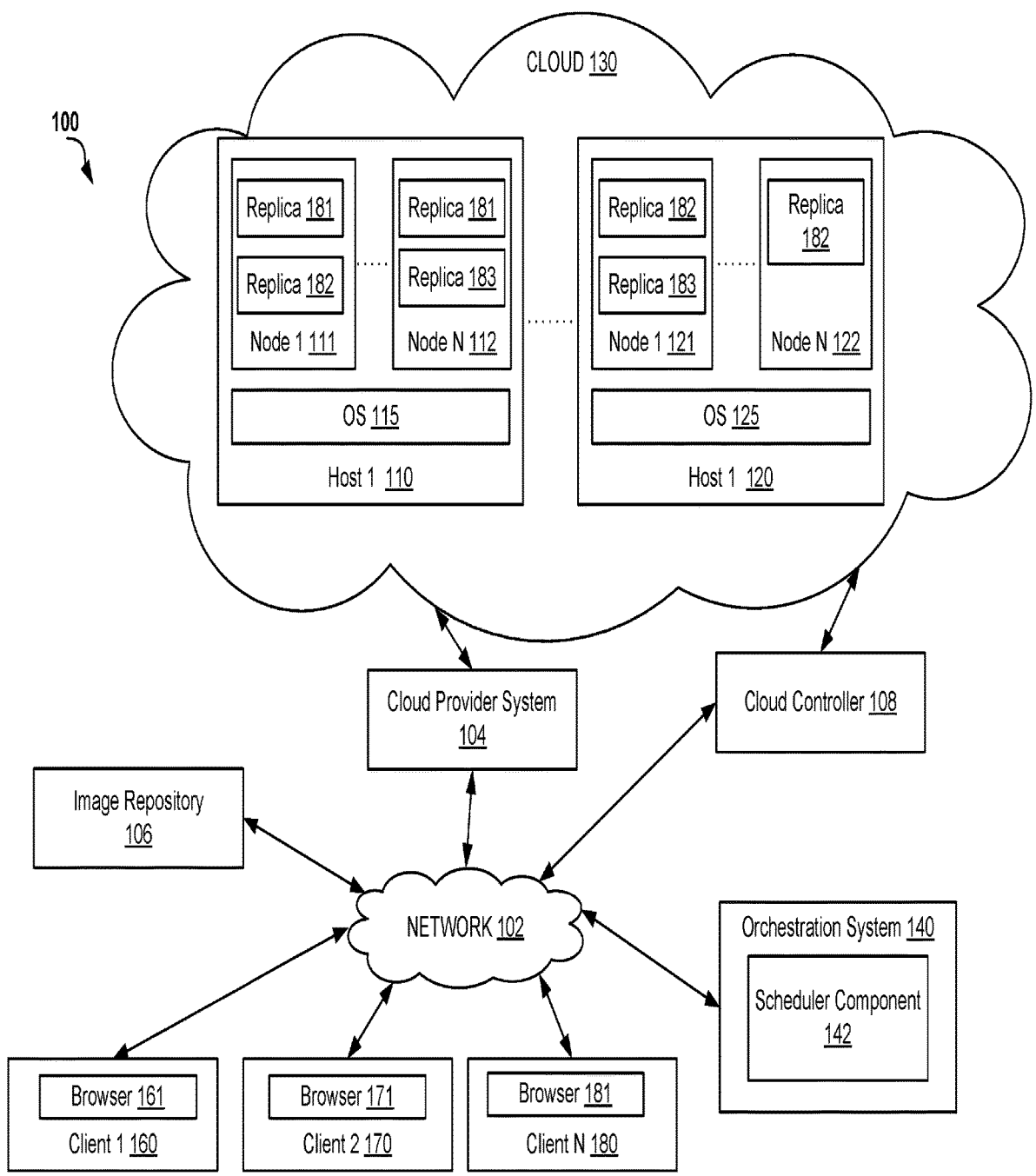
FIG. 1 is a block diagram of a network architecture in which implementations of the disclosure may operate.

Aspects of the disclosure provide for mechanisms for reducing service disruptions in a computer system. In a containerized software development environment, a software application can be developed by multiple entities (e.g., different developers). A container may be an execution environment represented by an isolated virtualized userspace instance of an operating system, such that the userspace instance is associated with a kernel instance which may be shared with other containers. The containers may be employed to store the software application code and microservices (e.g., a utility program such as a compiler) for performing operations on the software code. A micro-service may be an independently-deployable modular service that may communicate with other services in a system (e.g., a cloud-based system) through a lightweight interface. The code of the software application may be stored along with micro-services in containers to create containerized applications. The containerized application may be released as software product that can be executed as a self-contained application on nodes in a cloud. Each of the nodes (e.g., a host computer, a virtual machine, etc.) may support a container execution environment (e.g., a Docker environment).

In some embodiments, an application may be deployed as a plurality of services (e.g., micro-services) on one or more of the nodes. Each of the services may be hosted by one or more containers. More particularly, for example, multiple replicas of a service may be host by a plurality of containers running on one or more nodes. Each of the replicas may represent an instance of the service and may provide the same functionality of the service. The loss of one or more of the containers may result in service disruptions. For example, a first node of a computer system may host a replica of a first service and a replica of a second service. A second node of the computer system may host a replica of a third service and a replica of the second service. The first service may have four replicas running on various nodes of the computer system. The second service may have three replicas running on various nodes of the computer system. The third service may have two replicas running across various nodes of the computer system. A loss of the first node may result in a loss of 25% of the first service and a loss of 33% of the second service. A loss of the second node may result in a loss of 33% of the second service and a loss of 50% of the third service. As such, while the first node and the second node host the same number of service replicas, they may have different impacts on service disruptions in the computer system.

Conventional approaches to deploying and hosting applications and/or services typically schedule a deployment of a service on a node in view of processing capacities of the node (e.g., a utilization rate of computing resources, available computing resources, etc.) and the workload of the node. However, the conventional approaches fail to consider the node's impact on service disruptions when scheduling the deployment.

Aspects of the disclosure address the above deficiencies and other deficiencies by providing mechanisms (e.g., systems, methods, machine-readable media, etc.) for scheduling deployments of services and/or applications in view of service capacities of nodes in a computer system. To deploy a service and/or a replica of the service, the mechanisms can determine a plurality of nodes that may host the service replica and a plurality of lost impact factors for the nodes. Each of the lost impact factors may indicate an impact of a loss of a node on service disruptions in the computer system. The mechanisms can then select a node of the plurality of nodes in view of the lost impact factors and can deploy the service and/or the replica of the service on the selected node. In some embodiments, the mechanisms can select a node associated with a particular lost impact factor (e.g., a lost impact factor indicative of the least service disruptions across the nodes) to deploy the service and/or the replica of the service.

In some embodiments, one or more of the lost impact factors can be determined by determining one or more service capacity factors for each of the plurality of nodes. For example, a first lost impact factor may be determined for a first node by determining a combination (e.g., an absolute sum, a weighted sum, etc.) of one or more service capacity factors corresponding to the first node. Each of the service capacity factors may indicate an amount of service loss of a particular service resulted from a loss of the first node. For example, a first service capacity factor may be determined in view of the number of replicas of a first service running on the first node (also referred to as the "first number") and the number of replicas of the first service running across the plurality of nodes (also referred to as the "second number"). The first service capacity factor may be determined in view of a ratio of the first number to the second number.

Accordingly, aspects of the present disclosure provide for scheduling mechanisms that can enhance cluster orchestrators by taking service disruption impacts into consideration when placing containers on a node of a computer system. The mechanisms can monitor service capacities of a plurality of nodes and can minimize the amount of service loss when a node is lost (e.g., being shut down). As such, the mechanisms disclosed herein can balance all of the service capacities across the nodes in the computer system at runtime. For example, compared to conventional solutions for scheduling services that do not consider service disruptions, the technology disclosed herein provides for mechanisms for evaluating service disruptions resulted from node failures (e.g., by determining service capacity factors and/or lost impact factors described herein) and scheduling deployments of applications and/or services in a computer system (e.g., a micro-service environment) in view of the evaluation.

FIG. 1 is a block diagram of a network architecture 100 in which implementations of the disclosure may operate. In some implementations, the network architecture 100 may be used in a Platform-as-a-Service (PaaS) system, such as OpenShift®. The PaaS system provides resources and services (e.g., micro-services) for the development and execution of applications owned or managed by multiple users. A PaaS system provides a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems.

As shown in FIG. 1, the network architecture 100 may include a cloud-computing environment 130 (also referred to herein as a cloud) that includes nodes 111, 112, 121, 122 to execute applications and/or processes associated with the applications. A "node" providing computing functionality may provide the execution environment for an application of the PaaS system. In some implementations, the "node" may refer to a virtual machine (VM) that is hosted on a physical machine, such as host 1 110 through host N 120, implemented as part of the cloud 130. In some implementations, the host machines 110, 120 are often located in a data center. For example, nodes 111 and 112 are hosted on physical machine 110 in cloud 130 provided by cloud provider 104. In some implementations, an environment other than a VM may be used to execute functionality of the PaaS applications. When nodes 111, 112, 121, 122 are implemented as VMs, they may be executed by operating systems (OSs) 115, 125 on each host machine 110, 120.

In some implementations, the host machines 110, 120 may be located in a data center. Users can interact with applications executing on the cloud-based nodes 111, 112, 121, 122 using client computer systems, such as clients 160, 170 and 180, via corresponding web browser applications 161, 171 and 181. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS system controller 140. In view of these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each node 111, 112, 121, 122. This data may be used for the execution of applications for a multi-tenant PaaS system managed by the PaaS provider controller 140.

In one implementation, the data associated with the application may include data used for execution of one or more containers that include application images built from pre-existing application components and source code of users managing the application. As used herein, an image may refer to data representing executables and files of the application used to deploy functionality for a runtime instance of the application. In one implementation, the image can be built using suitable containerization technologies (e.g., using a Docker tool).

In some embodiments, each of nodes 111, 112, 121, 122 can host one or more containers. Each of the containers may be a secure process space on the nodes 111, 112, 121 and 122 to execute functionality of an application and/or a service. In some implementations, a container is established at the nodes 111, 112, 121 and 122 with access to certain resources of the underlying node, including memory, storage, etc. In one implementation, the containers may be established using the Linux Containers (LXC) method, cgroups, SELinux$^M$, and kernel namespaces, etc. A container may serve as an interface between a host machine and a software application. The software application may comprise one or more related processes and may provide a certain service (e.g., an HTTP server, a database server, etc.). Containerization is an operating-system-level virtualization environment of a host machine that provides a way to isolate the micro-service processes. At the same time, employing the containers makes it possible to develop and deploy new cloud-based micro-services in a cloud-based system. In some embodiments, each node may be and/or include a node 200 of FIG. 2.

Each of nodes 111, 112, 121, 122 can host one or more applications and/or services. Each of the services may correspond to an application and/or one or more components of the application and may provide one or more functionalities of the application. Examples of the services may include a web server, a database server, a middleware server, etc. Each of the services may run as an independent process in a suitable machine (e.g., a container, a virtual machine, a physical machine, etc.). A service running in system 100 may communicate with one or more other services in system 100. In one implementation, an application may be deployed as one or more services on one or more nodes 111, 112, 121, 122. Each of the services may be deployed in one or more containers. In some implementations, a service may be an application.

As illustrated in FIG. 1, each of nodes 111, 112, 121, 122 can host one or more replicas of applications and/or services. For example, each of replicas 181, 182, 183, and 184 may be a replica of an application (also referred to as the "application replica") or a replica of a service (also referred to as the "service replica"). The application replica may be an instance of the application that provides functionality of the application. The service replica may be an instance of the service that provides functionality of the service. Multiple application replicas of a given application may represent multiple instances of the application running on one or more nodes and may provide the same functionality of the application. Multiple service replicas of a given service may represent multiple instances of the service running on one or more nodes and may provide the same functionality of the service. In some embodiments, multiple application replicas (or service replicas) may be hosted by multiple containers and/or groups of containers (e.g., pods). Each of the containers or groups of containers may be a copy of a container or a group of containers hosting the application (or service).

Figure 7:
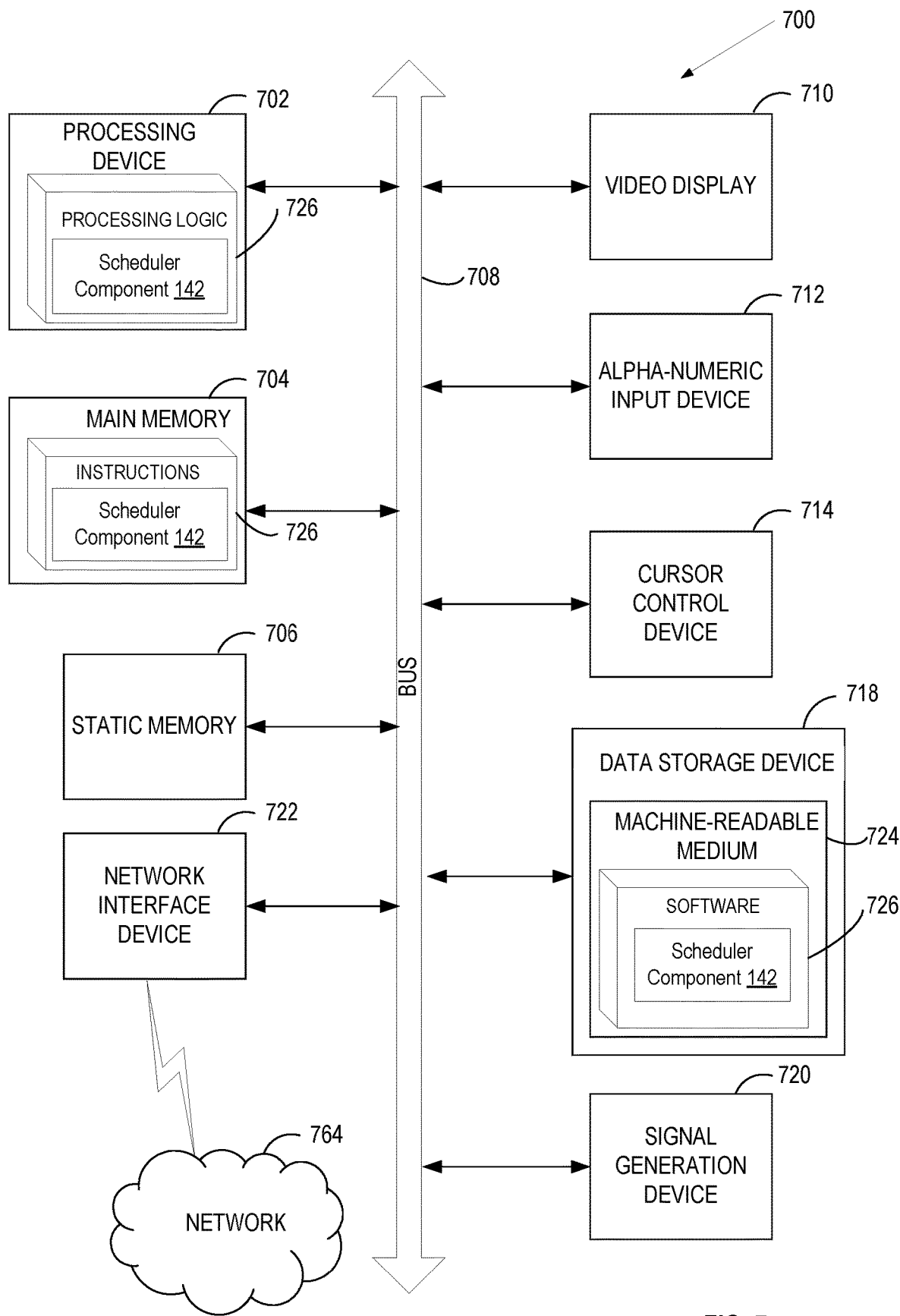
FIG. 7 illustrates a block diagram of one implementation of a computer system.

Orchestration system 140 may provide management and orchestration functions for deploying and/or managing applications and/or services in system 100. For example, orchestration system 140 can build one or more container images for providing functionality of the application and/or the service. The orchestration system 140 can then create one or more containers to host the application and/or service (e.g., by instructing one or more nodes 111, 112, 121, 122 to instantiate one or more containers from the container image(s)). Orchestration system 140 can include one or more computing devices (e.g., a computing device as shown in FIG. 7). Orchestration system 140 can implement an application programming interface (e.g., a Kubernetes API) to facilitate deployment, scaling, and management of containerized software applications.

In some embodiments, orchestration system 140 can deploy an application as one or more services on one or more nodes. Each of the services may be deployed in one or more containers. In some embodiments, a replica of the service may be created by deploying one or more containers on a node (e.g., by deploying a pod as described in connection with FIG. 2 and starting the pods to run the containers).

Figure 2:
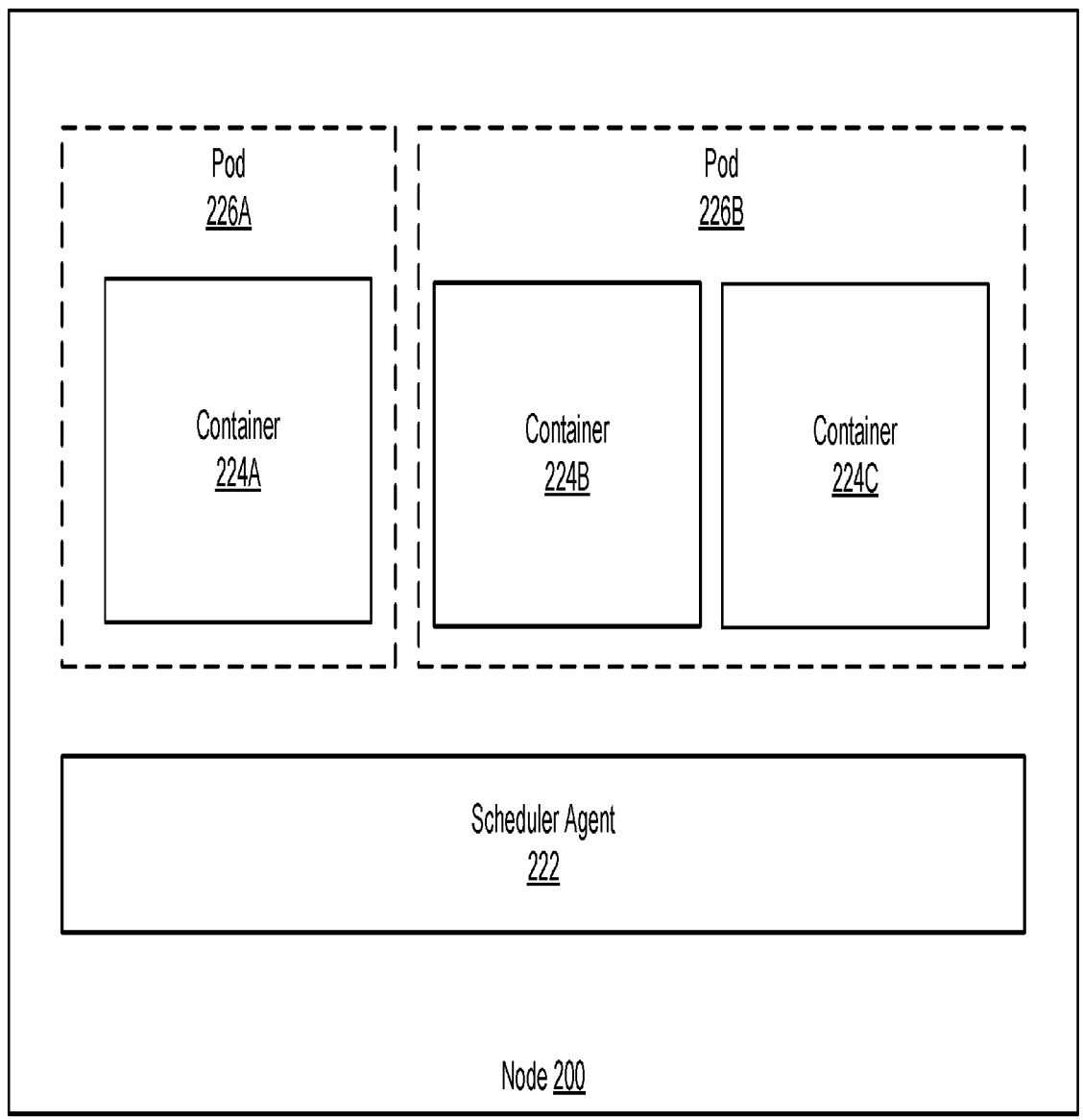
FIG. 2 a block diagram of an example of a node according to an implementation of the disclosure.

Orchestration system 140 can include a scheduler component 142 for scheduling deployments of applications and services on nodes 111, 112, 121, 122 and/or to perform any other function for system 100. Scheduler component 142 can correct data about one or more nodes 111, 112, 121, 122 for the deployments. The data may include, for example, data about available computing resources on each of the nodes, data about utilization of computing resources on each of the nodes, data about allocation of computing resources to workloads on each of the nodes, data about containers and groups of container (e.g., pods as illustrated in FIG. 2) running on each of the nodes, etc. The scheduler component 142 can determine a node failure, a container failure, a node failure, and/or any other event that may result in service disruptions in system 100. In some embodiments, the scheduler component 142 may collect the data by communicating with a scheduler agent (e.g., a scheduler agent 222 of FIG. 2) of a respective node. In some embodiments, the scheduler agent may implement a Kubelet service. [0030]. In some embodiments, the scheduler component 142 can control a threshold number of replicas of an application and/or service to be hosted in system 100. The threshold number may be any number (e.g., one, two, etc.) and may be specified by a user, the orchestration system 140, or any other suitable entity. For example, the scheduler component 142 can delete one or more containers hosting a replica of the application and/or service in response to determining that the number of the replicas of the application and/or service running in system 100 is greater than the threshold number.

As another example, in response to determining that the number of replicas of the application and/or service running on the nodes of computer system 100 is less than the threshold number, scheduler component 142 can deploy a replica of the service on one or more nodes 111, 112, 121, 122. For example, scheduler component 142 can deploy the replica by deploying one or more containers on a node (e.g., by deploying a pod) and launching the container(s) (e.g., starting the pods to being running the container(s)). As another example, scheduler component can deploy the replica by instantiating the replica on one or more virtual machines hosted by one or more nodes 111, 112, 121, 122.

In some embodiments, scheduler component 142 can select one of nodes 111, 112, 121, 122 for the deployment of the replica of the service. The selection may be made, for example, in view of computing resources available on each of the nodes for the deployment, existence of a port conflict or a storage conflict for deploying the replica on a particular node, etc. The selection may also be made in view of impacts of a loss of a node on services and/or application running in the system 100. In the example shown in FIG. 1, nodes 111 and 112 may host replica 181 of a first application and/or a first service. Nodes 111, 121, and 122 may host replica 182 of a second application and/or a second service. Nodes 112 and 121 may host replica 183 of a third application and/or a third service. When node 111 is lost (e.g., shut down), the services hosted by the node 111 may be impacted. For example, given that two replicas of the first service (e.g., replica 181) are hosted in system 100 and that one replica of the first service (or application) is running on node 111, the first service may loss ½ of its service capacity when node 111 is shut down. As another example, given that three replicas of the second service (e.g., replica 182) are hosted in system 100 and that one replica of the second service is running on node 111, the second service may loss ⅓ of its service capacity when node 111 is lost. The total impact of the loss of node 111 on the services/applications running in system 100 may be estimated as being a combination of ½ and ⅓ (e.g., ⅚). Similarly, the first service may lose ½ of its service capacity when the node 112 is lost. The third service (e.g., a service corresponding to replica 183) may lose ½ of its service capacity when node 112 is shut down. The total impact of the loss of node 121 on the services/applications running in system 100 may be estimated as being a combination of ½ and ½ (e.g., 1). As such, the loss of node 112 may have a greater impact on the system 100 than that of node 111. Scheduler component 142 can select a node of system 100 that has a particular impact on the services and/or applications running in system 100 to deploy an application replica and/or a service replica.

In some embodiments, the scheduler component 142 can include one or more components described in connection with FIG. 3 and can implement one or more methods described in connection with FIGS. 4-6.

While various implementations are described in terms of the environment described above, the facility may be implemented in a variety of other environments including a single, monolithic computer system, as well as various other combinations of computer systems or similar devices connected in various ways. For example, the scheduler component 142 may be running on a node, such as nodes 111, 112, 121, 122, of the system 100 hosted by cloud 130, or may execute external to cloud 130 on a separate server device. In some implementations, the scheduler component 142 may include more components that what is shown that operate in conjunction with the PaaS system of network 100.

FIG. 2 is a block diagram of an example 200 of a node according to an implementation of the disclosure. Node 200 can be a system providing run-time environments for one or more containers. Node 200 may comprise a computing device with one or more processors communicatively coupled to memory devices and input/output (I/O) devices, as described in more details herein below with references to FIG. 7. Node 200 may include an operating system (not shown in FIG. 2) with one or more user space programs. The operating system may be any program or combination of programs that are capable of using the underlying computing device to perform computing tasks. The operating system may include a kernel comprising one or more kernel space programs (e.g., memory driver, network driver, file system driver) for interacting with virtual hardware devices or actual hardware devices (e.g., para-virtualization). User space programs may include programs that are capable of being executed by the operating system and in one example may be an application program for interacting with a user. Although node 200 comprises a computing device, the term "node" may refer to the computing device (e.g., physical machine), a virtual machine, or a combination thereof.

Node 200 may provide one or more levels of virtualization such as hardware level virtualization, operating system level virtualization, other virtualization, or a combination thereof. Node 200 may provide hardware level virtualization by running a hypervisor that provides hardware resources to one or more virtual machines. The hypervisor may be any program or combination of programs and may run on a host operating system or may run directly on the hardware (e.g., bare-metal hypervisor). The hypervisor may manage and monitor various aspects of the operation of the computing device, including the storage, memory, and network interfaces. The hypervisor may abstract the physical layer features such as processors, memory, and IO devices, and present this abstraction as virtual devices to a virtual machine.

Node 200 (e.g., physical machine or virtual machine) may also or alternatively provide operating system level virtualization by running a computer program that provides computing resources to one or more containers 224A-C. Operating system level virtualization may be implemented within the kernel of operating system and may enable the existence of multiple isolated containers. In one example, operating system level virtualization may not require hardware support and may impose little to no overhead because programs within each of the containers may use the system calls of the same underlying operating system. This enables node 200 to provide virtualization without the need to provide hardware emulation or be run in an intermediate virtual machine as may occur with hardware level virtualization.

Operating system level virtualization may provide resource management features that isolate or limit the impact of one container (e.g., container 224A) on the resources of another container (e.g., container 224B or 224C). The operating system level virtualization may provide a pool of resources that are accessible by container 224A and are isolated from one or more other containers (e.g., container 224B). The pool of resources may include file system resources (e.g., particular volume), network resources (e.g., particular network address), memory resources (e.g., particular memory portions), other computing resources, or a combination thereof. The operating system level virtualization may also limit a container's access to one or more computing resources by monitoring the containers activity and restricting the activity in view of one or more limits (e.g., quotas). The limits may restrict the rate of the activity, the aggregate amount of the activity, or a combination thereof. The limits may include one or more of disk limits, input/out (I/O) limits, memory limits, CPU limits, network limits, other limits, or a combination thereof. In one example, an operating system virtualizer provides the computing resources to containers 224A-C. The operating system virtualizer may wrap an application in a complete file system that contains the code, runtime, system tools, system libraries and other programs installed on the node that can be used by the application. In one example, the operating system virtualizer may be the same or similar to Docker for Linux®, ThinApp® by VMWare®, Solaris Zones® by Oracle®, or other program that automates the packaging, deployment, and execution of applications inside containers.

Each of the containers 224A-C may refer to a resource-constrained process space of node 200 that can execute functionality of a program. Containers 224A-C may be referred to as a user-space instances, a virtualization engines (VE), or jails and may appear to a user as a standalone instance of the user space of an operating system. Each of the containers 224A-C may share the same kernel but may be constrained to only use a defined set of computing resources (e.g., CPU, memory, IO). Aspects of the disclosure can create one or more containers to host a framework or provide other functionality of an application (e.g., proxy agent functionality, database functionality, web application functionality, etc.) and may therefore be referred to as "application containers."

Pods 226A and 226B may be data structures that are used to organize one or more containers 224A-C and enhance sharing between containers, which may reduce the level of isolation between containers within the same pod. Each pod may include one or more containers that share computing resources with another container associated with the pod. Each pod may be associated with a unique identifier, which may be a networking address (e.g., an IP address), that allows applications to use ports without a risk of conflict. A pod may be associated with a pool of resources and may define a volume, such as a local disk directory or a network disk and may expose the volume to one or more (e.g., all) of the containers within the pod. In one example, all of the containers associated with a particular pod may be co-located on the same node 200. In another example, the containers associated with a particular pod may be located on different nodes that are on the same or different physical machines. Node 200 can have any suitable number of pods. Each of the pods may have any suitable number of containers.

In some embodiments, node 200 may host one or more applications and/or services. For example, node 200 can host service replicas for one or more applications and/or services. Each of the services may correspond to an application. Each of the service replicas may be a copy of a service and may run as an independent process in one or more containers 224A-C. In one implementation, each of pods 226A and 226B may host a respective service replica. The service replicas hosted by pods 226A and 226B may or may not correspond to the same service and/or application.

Node 200 can include a scheduler agent 222 that can create, start, stop, manage, etc. one or more of the containers and/or pods on node 200. In some embodiments, scheduler agent can implement a Kubelet service.

Scheduler agent 222 can also monitor the running state of node 200, containers 224A-C, and/or pods 226A-B and can transmit data about the running state (also referred to as the data about the node state) to the scheduler component 142 of FIG. 2. In some embodiments, the data about the node state may be transmitted to the scheduler component 142 periodically, at random time instances, or in any other suitable interval. In some embodiments, the data about the node state may be transmitted to the scheduler component 142 in response to receiving a request for the data from the scheduler component 142.

Scheduler agent 222 can relay other information to and from the scheduler component 142 and/or any other component of orchestration system 140. For example, scheduler agent 222 can receive commands, manifests, etc. for deploying and/or managing containers and/or pods on node 200. The commands may include, for example, a command to deploy a container, a command to deploy a pod, a command to deploy a service and/or an application, a command to deploy a service replica or an application replica, etc. The manifests may include, for example, a container manifest including properties of a container or a pod (e.g., one or more container images, one or more containers to be deployed, commands to execute on boot of the container(s), ports to enable upon the deployment of the container(s), etc.). In some embodiments, scheduler agent 222 can deploy a container and/or a pod on node 200 in view of the commands, manifest, and/or any other data provided by scheduler system 140.

Figure 3:
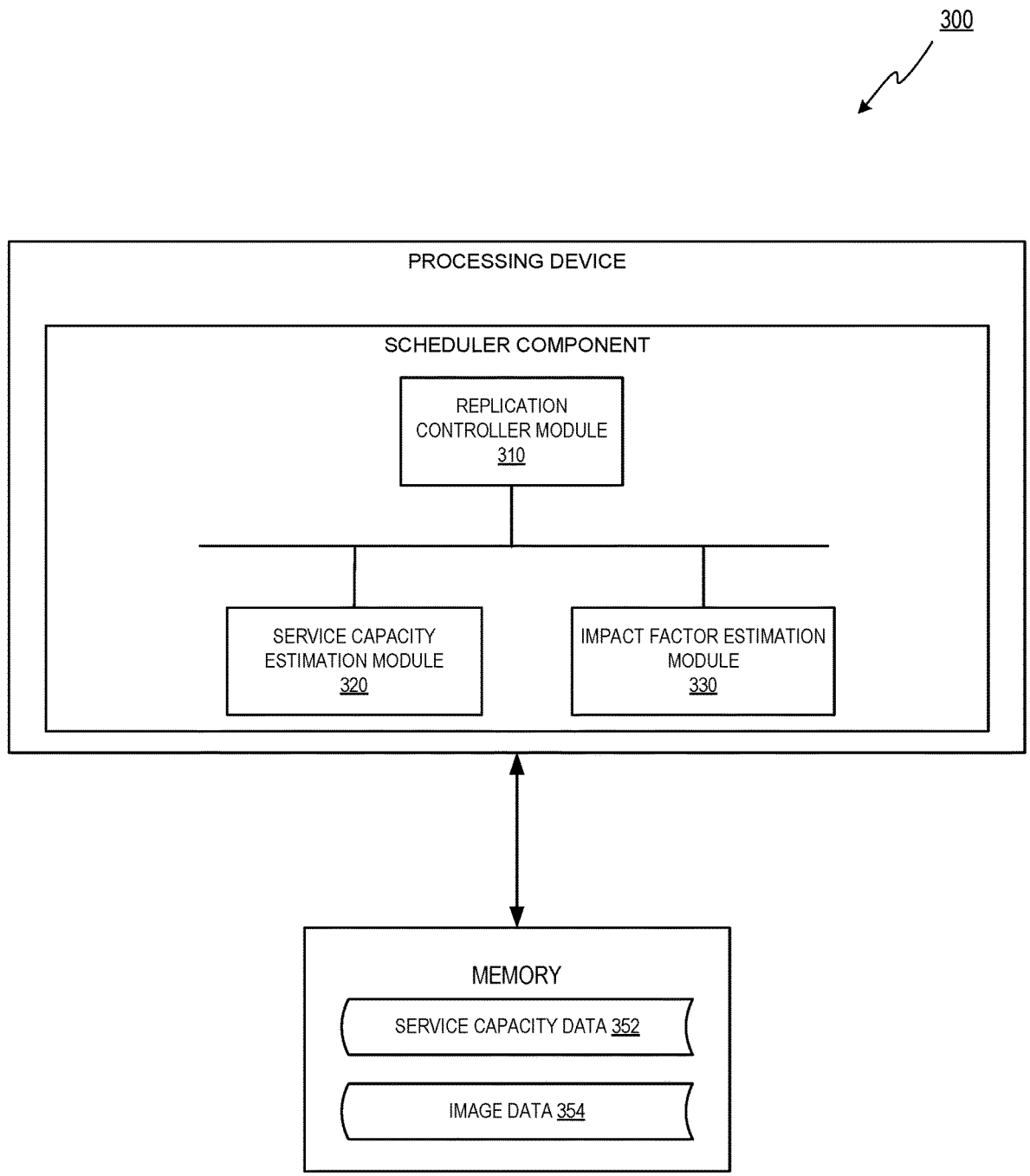
FIG. 3 depicts a block diagram of a computer system operating in accordance with one or more aspects of the present disclosure.

FIG. 3 depicts a block diagram of a computer system 300 operating in accordance with one or more aspects of the present disclosure. Computer system 300 may be the same or similar to computer system 100 and may include one or more processing devices and one or more memory devices. In the example shown, computer system 300 may include a replication controller module 310, a mapping module 320, and a data transmission module 330.

Replication controller module 310 can schedule deployments of services and/or applications on one or more nodes of a computer system. For example, replication controller module 310 can instruct a node to create one or more containers to host an application replica and/or a service replica.

Service capacity estimation module 320 can estimate an amount of service loss in the computer system when a node of the computer system is lost (e.g., shut down). For example, service capacity estimation module 320 can identify one or more services and/or applications running on the node and can determine a service capacity factor for each of the identified services and/or applications. The service capacity factor may represent an amount of loss of a particular service resulted from a loss of the node (e.g., a shutdown of the node). In one implementation, service capacity estimation module 320 can determine the number of replicas of the first service (or application) running on the node (also referred to as the "first number") and the number of replicas of a first service (or application) running in the computer system (also referred to as the "second number"). Service capacity estimation module 320 can then determine a capacity service factor for the first service (or application) by determining a ratio of the first number to the second number. The capacity service factor may be, for example, the ratio of the first number to the second number, a percentage corresponding to the ratio, a faction corresponding to the ratio, or any other number determined based on the ratio.

Impact factor estimation module 330 can determine impacts of a loss of a node on applications and/or services running in the computer system. For example, impact factor estimation module 320 can determine a plurality of lost impact factors corresponding to a plurality of nodes of the computer system. Each of the lost impact factors may represent an impact on service disruptions in the computer system when one of the nodes is lost (e.g., shut down). For example, for a given node of the computer system, impact factor estimation module 320 can determine a plurality of service capacity factors corresponding to a plurality of services and/or applications running one the given node (e.g., in view of data provided by service capacity estimation module 320).

Impact factor estimation module 330 can then determine a lost impact factor for the given node in view of the plurality of service capacity factors. For example, impact factor estimation module 330 can determine a combination of the service capacity factors. In some embodiments, impact factor estimation module 330 can assign different weights to different applications and/or services and can determine the lost impact factor as a weighted sum of the service capacity factors. For example, impact factor estimation module 330 can determine a type for each of a plurality of services (or applications) running on a node. A type of a service (or application) may be, for example, a web server, a database server, a middleware server, a framework server, etc. Impact factor estimation module 330 can determine a priority for each of the identified services in view of the service types. In some embodiments, a particular service type may be assigned a particular priority (e.g., a relatively higher priority). As an example, a relatively higher priority may be assigned to a service comprising a database server while a relatively lower priority may be assigned to a service comprising a web server.

In some embodiments, impact factor estimation module 330 can determine, for each of the services, a user associated with the service. Impact factor estimation module 330 can then assign different priorities to the services in view of the identified users. In some embodiments, a particular priority (e.g., a relatively higher priority) may be assigned to a particular user (e.g., an enterprise user, a user paying a particular price for services provided by the computer system, etc.). More particularly, for example, a user paying a relatively higher price for services by the computer system may be assigned a relatively higher priority while a user paying a relatively lower price may be assigned a relatively lower priority.

Replication controller module 310 can deploy services and/or applications in view of data provided by service capacity estimation module 320 and/or impact factor estimation module 330. For example, replication controller module 310 can select, from a plurality of nodes that can host a service replica, a node to deploy the service replica.

The selection may be made in view of a plurality of lost impact factors corresponding to the plurality of nodes. For example, the replication controller module 310 can select a node associated with a particular lost impact factor (e.g., a lost impact factor indicative of the least impact on the computer system).

Computer system 300 can also include one or more memory devices storing service capacity data 352 (e.g., service capacity factors, lost impact factors, etc.). The memory devices can also store image data 354 for deployment of services and/or applications in computer system 300. Image data 354 can include one or more images that may be any data structure for storing and organizing information that may be used by a node to provide a computing service. The information within an image of image data 354 may indicate the state of the image and may include executable information (e.g., machine code), configuration information (e.g., settings), or content information (e.g., file data, record data). Each of the images may be capable of being loaded onto a node and may be executed to perform one or more computing tasks. Image data 354 may include one or more container images, virtual machine images, disk images, other images, or a combination thereof. A container image may include a user space program (e.g., application) along with a file system that contains the executable code, runtime, system tools, system libraries and other programs to support the execution of the user space program on a node. In some embodiments, the container image does not include an operating system but may be run by an operating system virtualizer that is part of an existing operating system of the node. In some embodiments, a container image may be used to deploy a container on a node (e.g., by creating and instantiating the container from the container image). A virtual machine image may include both an operating system and one or more user space programs. The virtual machine image may be loaded onto the node and may be run by a hypervisor. A disk image may be the same or similar to a virtual machine image (e.g., virtual disk image) but may be loaded onto node 120 and run without using a hypervisor or other form of virtualization technology. In one example, an image may be generated by creating a sector-by-sector copy of a source medium (e.g., hard drive of example machine). In another example, a disk image may be generated based on an existing image and may be manipulated before, during, or after being loaded and executed. In some embodiments, a virtual machine image and/or a disk image may be used to instantiate a service replica or an application replica on a node.

Figure 4:
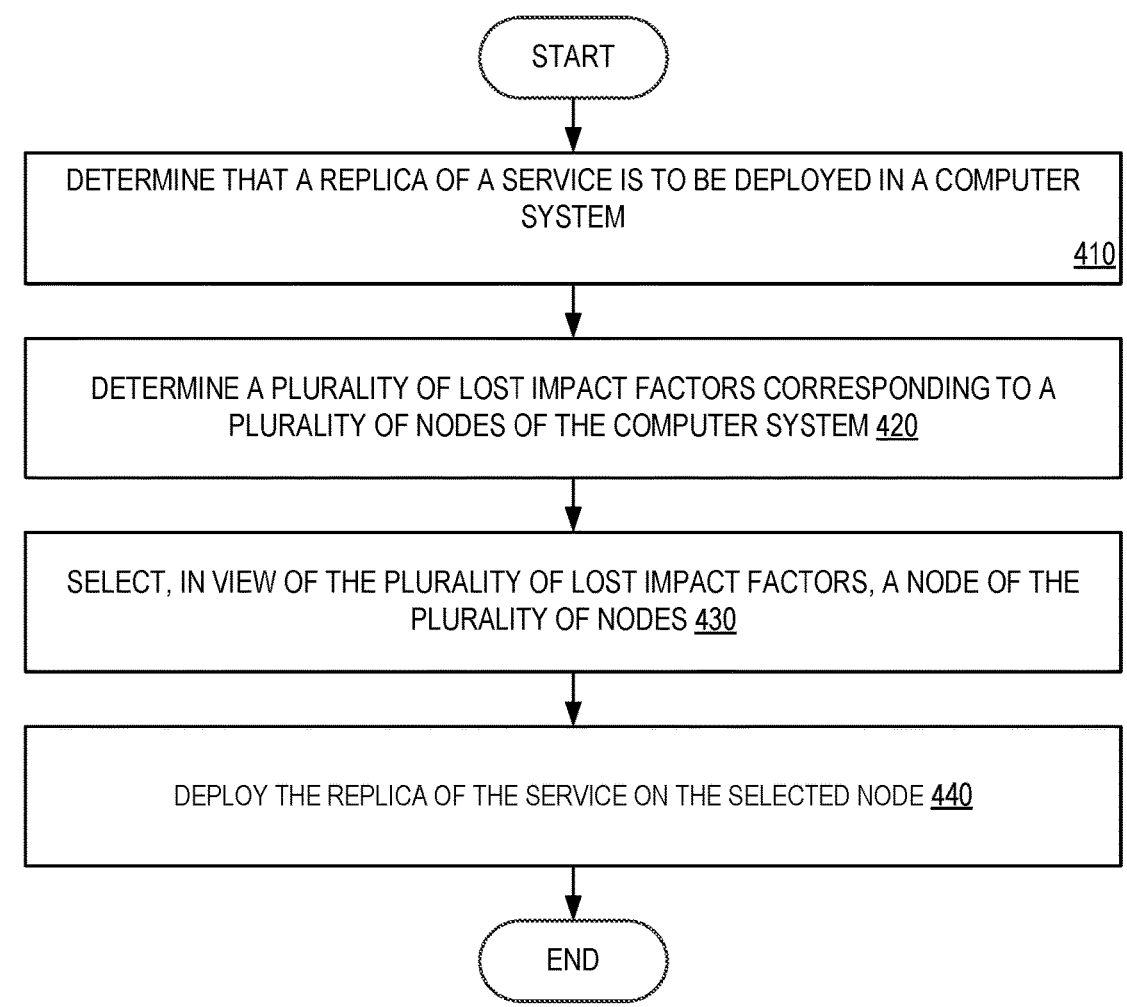
FIG. 4 is a flow diagram illustrating a method for scheduling deployment of services in a computer system according to an implementation of the disclosure.

FIG. 4 is a flow diagram illustrating a method 400 for scheduling deployment of services in a computer system according to an implementation of the disclosure. Method 400 can be performed by processing logic that may comprise hardware (e.g., circuitry, dedicated logic, programmable logic, microcode, etc.), software (such as instructions run on a processing device), firmware, or a combination thereof. In one implementation, method 400 is performed by a processing device (e.g. a processing device 702 of FIG. 7) implementing a scheduler component as described in connection with FIGS. 1-3.

Method 400 may begin at block 410 where the processing device can determine that a replica of a service is to be deployed in a computer system. For example, the processing device can make the determination in response to receiving a request to deploy the replica of the service. As another example, the processing device can make the determination in view of the number of replicas of the service running in the computer system. In one implementation, the processing device can determine that the replica of the service is to be deployed in response to determining that the number of the replicas of the service running in the computer system is not less than a threshold. The threshold may be specified by a user in some embodiments. The computer system may be, for example, the network architecture 100 of FIG. 1.

At block 420, the processing device can determine a plurality of lost impact factors corresponding to a plurality of nodes of the computer system. Each of the lost impact factors may represent an impact on the computer system when one of the nodes is lost (e.g., failed, shut down, etc.). In some embodiments, the processing device can determine, for each of the nodes, a lost impact factor. For example, for a given node of the computer system, the processing device can determine a plurality of service capacity factors corresponding to a plurality of services running one the given node. The processing device can then determine a lost impact factor for the given node in view of the plurality of service capacity factors (e.g., by determining a combination of the service capacity factors). In some embodiments, the plurality of lost impact factors may be determined for the nodes of the computer system by performing one or more operations described in connection with FIGS. 5 and 6.

At block 430, the processing device can select, in view of the plurality of lost impact factors, a node of the plurality of nodes (e.g., a first node). For example, the processing device can rank the nodes in view of the lost impact factors corresponding to the nodes and can select a node having a particular ranking (e.g., the top ranked node). In one implementation, a node associated with a relatively less impact factor may be assigned a relatively higher ranking. In another implementation, a node associated with a relatively greater impact factor may be assigned a relatively higher ranking. The processing device select a node associated with the lowest ranking for the deployment of the service. The processing device can select a node associated with a particular lost impact factor (e.g., the least lost impact factor, the second least lost impact factor, etc.). In some embodiments, a first node may be selected in response to determining that a first lost impact factor corresponding to the first node is not greater than at least one other lost impact factor of the plurality of lost impact factors At block 440, the processing device can deploy the replica of the service on the selected node. For example, the processing device can create one or more containers on the node to host the replica of the service. In some embodiments, a pod of one or more containers may be created on the node to host the replica of the service. As another example, the processing device can provision and/or execute the service on the node (e.g., a virtual machine).

Figure 5:
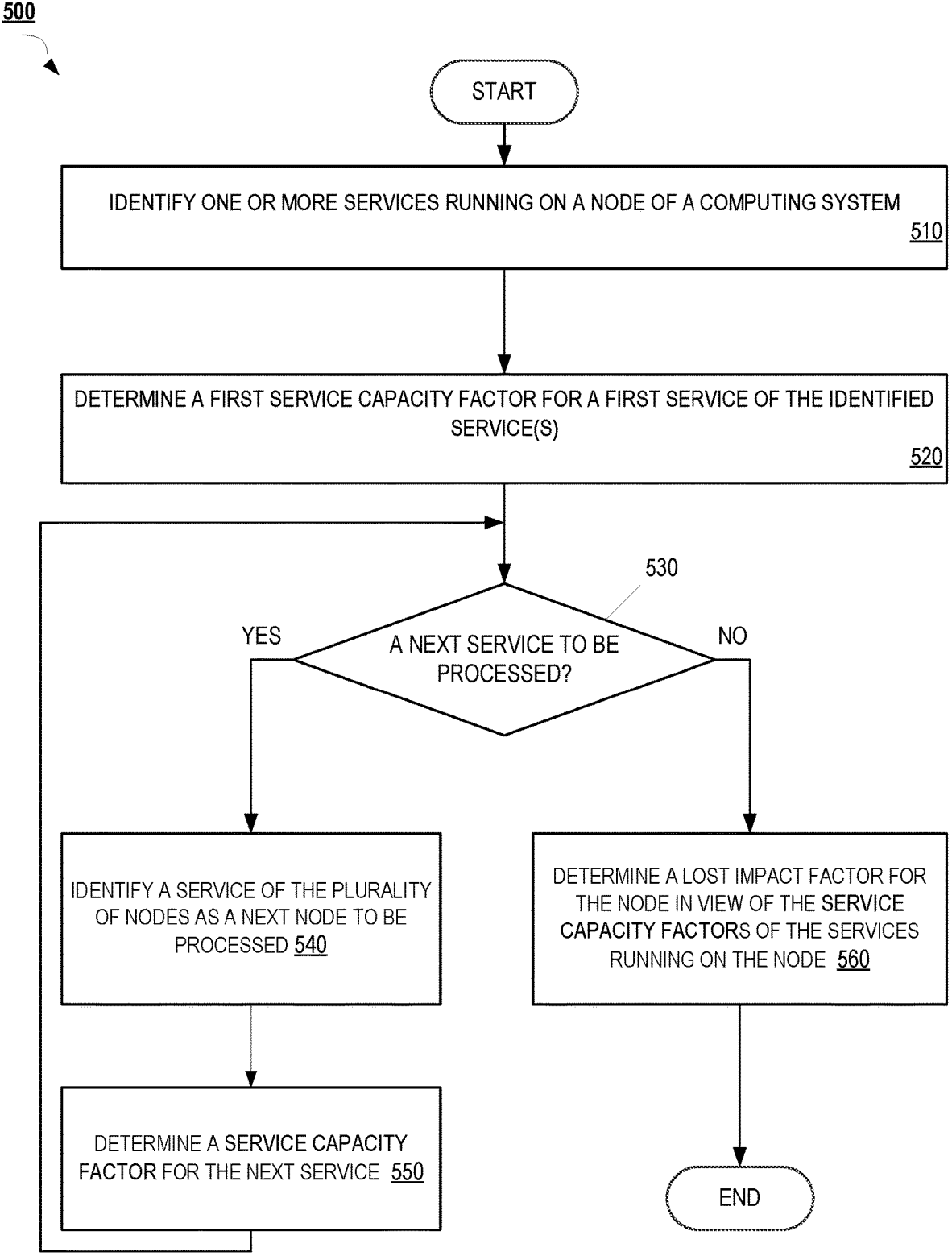
FIG. 5 is a flow diagram illustrating a method estimating service disruptions for a computer system according to an implementation of the disclosure.

FIG. 5 is a flow diagram illustrating a method 500 estimating service disruptions for a computer system according to an implementation of the disclosure. Method 500 can be performed by processing logic that may comprise hardware (e.g., circuitry, dedicated logic, programmable logic, microcode, etc.), software (such as instructions run on a processing device), firmware, or a combination thereof. In one implementation, method 500 is performed by a processing device (e.g. a processing device 702 of FIG. 7) implementing a scheduler component as described in connection with FIGS. 1-3.

Referring to FIG. 5, method 500 may begin at block 510 where a processing device can identify one or more services running on a node of a computer system. Each of the services may be, for example, a web server, a database server, a middleware server, etc.

At block 520, the processing device can determine a first service capacity factor for a first service of the identified service. For example, the processing device can determine a first number of replicas of the first service running on the first node and a second number representative of a total number of replicas of the first service running in a computer system (e.g., running on a plurality of nodes of the computer system). The processing device can then determine the first service capacity factor in view of the first number and the second number. More particularly, for example, the processing device can determine a ratio of the first number to the second number (also referred to as the "first ratio") and can determine the first service capacity factor in view of the first ratio. The first service capacity factor may be, for example, the first ratio, a fraction determined based on the first ratio, a percentage determined based on the first ratio, etc.

At block 530, the processing device can determine whether a next service of the identified services is to be processed. In some embodiments, the processing device can proceed to block 540 and can identify a node of the identified nodes as the next node to be processed in response to determining that one or more of the identified nodes are to be processed. The next node can be any node that has not been processed to determine a service capacity factor.

At block 550, the processing device can determine a service capacity factor for the next service. For example, a second service capacity factor may be determined for a second service of the plurality of services identified at 510. More particularly, for example, the processing device can determine a third number of replicas of the second service running on the first node and a fourth number representative of a total number of replicas of the second service running in a computer system (e.g., running on a plurality of nodes of the computer system). The processing device can then determine the second service capacity factor in view of the third number and the fourth number. More particularly, for example, the processing device can determine a ratio of the third number to the fourth number (also referred to as the "second ratio") and can determine the second service capacity factor in view of the second ratio. The second service capacity factor may be, for example, the second ratio, a fraction determined based on the second ratio, a percentage determined based on the second ratio, etc.

In some embodiments, the processing device can proceed to block 560 in response to determining that each of the services identified at 520 has been processed ("NO" at block 530). At block 560, the processing device can determine a lost impact factor for the node in view of the service capacity factors of the services running on the node. For example, the processing device can determine the lost impact factor by determining a combination of the service capacity factors. In one implementation, the combination of the service capacity factor s may be an absolute sum of the service capacity factor s. In another implementation, the processing device can assign a weight to each of the service capacity factor s and can determine a weighted sum of the service capacity factor s. A weight assigned to a given service capacity factor of the service capacity factor s may be determined based on a service corresponding to the given service capacity factor, a priority of a user associated with the service, etc.

Figure 6:
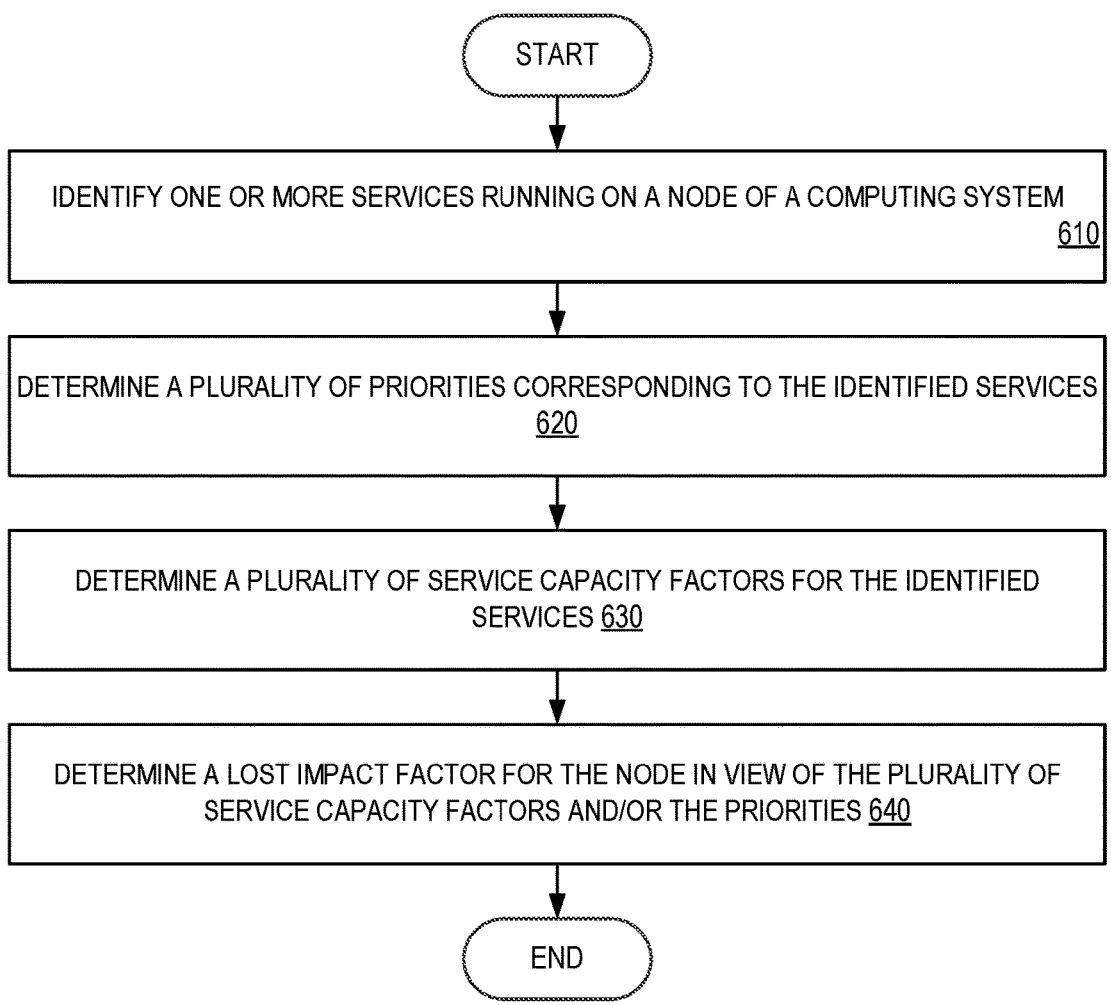
FIG. 6 is a flow diagram illustrating a method estimating service capacities for a node of a computer system according to an implementation of the disclosure.

FIG. 6 is a flow diagram illustrating a method 600 for estimating service capacities for a node of a computer system according to an implementation of the disclosure. Method 600 can be performed by processing logic that may comprise hardware (e.g., circuitry, dedicated logic, programmable logic, microcode, etc.), software (such as instructions run on a processing device), firmware, or a combination thereof. In one implementation, method 600 is performed by a processing device (e.g. a processing device 702 of FIG. 7) implementing a scheduler component as described in connection with FIGS. 1-3.

Referring to FIG. 6, method 600 may begin at block 610 where a processing device can identify one or more services running on a node of a computer system. Each of the services may be, for example, an HTTP server, a database server, a middleware server, etc.

At block 620, the processing device can determine a plurality of priorities corresponding to the identified services. For example, the priorities may be determined based on a service type of each of the service. The processing device can determine a service type for each of the identified services. The service type may be, for example, a web server, a database server, a middleware server, a framework server, etc. The processing device can determine a priority for each of the identified services in view of the service types. In some embodiments, a particular service type may be assigned a particular priority (e.g., a relatively higher priority). As an example, a relatively higher priority may be assigned to a service comprising a database server while a relatively lower priority may be assigned to a service comprising a web server.

As another example, the priorities may be determined in view of one or more users associated with the services. The processing device can determine, for each of the services, a user associated with the service. The processing device can then assign different priorities to the services in view of the identified users. In some embodiments, a particular priority (e.g., a relatively higher priority) may be assigned to a particular user (e.g., an enterprise user, a user paying a particular price for services provided by the computer system, etc.). More particularly, for example, a user paying a relatively higher price for services by the computer system may be assigned a relatively higher priority while a user paying a relatively lower price may be assigned a relatively lower priority.

As a further example, the priorities may be determined in view of the service types and the users associated with the services running on the node. For example, the processing device can determine a first priority factor for a first service in view of a service type of the first service. The processing device can also determine a second priority factor for the first service in view of a user associated with the first service. The processing device can then determine a priority for the first service in view of the first priority factor and the second priority factor (e.g., by determining a combination of the first priority factor and the second priority factor).

At block 630, the processing device can determine a plurality of service capacity factors for the identified services. For example, the processing device can regard the priorities as being the service capacity factors. As another example, the processing device can determine the capacity factors by performing one or more operations described in connection with FIG. 5 above.

At block 640, the processing device can determine a lost impact factor for the node in view of the plurality of service capacity factors and/or the priorities. For example, the processing device can determine a combination of the plurality of service capacity factors as the lost impact factor. In one implementation, the combination of the plurality of service capacity factors may be an absolute sum of the service capacity factors. In another implementation, a combination of the plurality of service capacity factors may be a weighted sum of the service capacity factors. Each of the services and/or the service capacity factors may be assigned a weight in view of the priorities. For example, a relatively greater weight may be assigned to a service and/or its associated service capacity factor associated with a relatively higher priority.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media.

FIG. 7 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 700 includes a processing device 702 (e.g., processor, CPU, etc.), a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 708.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 400 may further include a network interface device 722 communicably coupled to a network 764. The computer system 400 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 718 may include a machine-accessible storage medium 724 on which is stored software 726 embodying any one or more of the methodologies of functions described herein. The software 726 may also reside, completely or at least partially, within the main memory 704 as instructions 726 and/or within the processing device 702 as processing logic 726 during execution thereof by the computer system 400; the main memory 704 and the processing device 702 also constituting machine-accessible storage media.

The machine-readable storage medium 724 may also be used to store instructions 726 to manage thread pools, such as the scheduler component 142 as described with respect to FIGS. 1-3, and/or a software library containing methods that call the above applications. While the machine-accessible storage medium 724 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Other computer system designs and configurations may also be suitable to implement the system and methods described herein. The following examples illustrate various implementations in accordance with one or more aspects of the present disclosure.

Example 1 is a method, comprising: determining that a service replica is to be deployed in a computer system; determining, by a processing device, a plurality of lost impact factors corresponding to a plurality of nodes of the computer system, wherein each of the lost impact factors indicates an impact of a loss of a respective node of the plurality of nodes on service disruptions in the computer system; selecting, in view of the plurality of lost impact factors, a first node of the plurality of nodes; and deploying the service replica on the first node.

Example 2 is the method of example 1, wherein selecting, in view of the plurality of lost impact factors, the first node of the plurality of nodes comprises: determining that a first lost impact factor corresponding to the first node is not greater than at least one other lost impact factor of the plurality of lost impact factors.

Example 3 is the method of example 2, wherein determining the first lost impact factor comprises: identifying one or more services running on the first node; and determining a plurality of service capacity factors corresponding to the identified services, wherein each of the service capacity factors represents an amount of service loss of one of the identified services resulted from a loss of one of the first node.

Example 4 is the method of example 3, wherein determining the first lost impact factor in view of the plurality of service capacity factors comprises determining a combination of the plurality of service capacity factors.

Example 5 is the method of example 4, wherein the combination of the plurality of service capacity factors comprises at least one of an absolute sum of the service capacity factors or a weighted sum of the service capacity factors.

Example 6 is the method of example 3, wherein determining the plurality of service capacity factors comprises: determining a first number of replicas of a first service running on the first node; determining a second number of replicas of the first service running on the plurality of nodes; and determining, in view of the first number and the second number, a first service capacity factor corresponding to the first service.

Example 7 is the method of example 6, wherein determining, in view of the first number and the second number, the first service capacity factor corresponding to the first service comprises: determining a ratio of the first number to the second number.

Example 8 is the method of example 3, further comprising: determining a second service capacity factor corresponding to a second service running on the first node; and determining the first lost impact factor in view of the first service capacity factor and the second service capacity factor.

Example 9 is the method of example 1, wherein deploying the service replica on the first node comprises: deploying a container on the first node to host the service replica.

Example 10 is the method of example 1, wherein deploying the service replica on the first node comprises: instantiate an instance of the service replica on a virtual machine.

Example 11 is a method, comprising: identifying a plurality of services running on a node of a computer system; determining, by a processing device, a plurality of service capacity factors for the plurality of services, wherein each of the service capacity factors represents an amount of service loss of one of the identified services resulted from a loss of the node, and wherein determining the plurality of service capacity factors comprises: determining a first number of replicas of a first service running on the node; determining a second number of replicas of the first service running on a plurality of nodes of the computer system; and determining, in view of the first number and the second number, a first service capacity factor corresponding to the first node; and determining, by the processing device, a lost impact factor in view of the plurality of service capacity factors.

Example 12 is the method of example 11, wherein determining, in view of the first number and the second number, the first service capacity factor comprises determining a ratio of the first number to the second number.

Example 13 is the method of example 12, wherein determining the plurality of service capacity factors further comprises: determining a third number of replicas of a second service of the plurality of services running in the computer system; determining a fourth number of replicas of the second service running on the node; and determining a second service capacity factor in view of the third number and the fourth number.

Example 14 is the method of example 11, wherein determining the lost impact factor in view of the plurality of service capacity factors comprises: determining a combination of the plurality of service capacity factors.

Example 15 is the method of example 14, wherein the combination of the plurality of service capacity factors comprises an absolute sum of the plurality of service capacity factors.

Example 16 is the method of example 14, wherein the combination of the plurality of service capacity factors comprises a weighted sum of the plurality of service capacity factors.

Example 17 is a method, comprising: identifying a plurality of services running on a node of a computer system; determining a plurality of priorities corresponding to the plurality of services; determining, by a processing device, a plurality of service capacity factors for the plurality of services in view of the plurality of priorities; and determining, by the processing device, a lost impact factor in view of the plurality of service capacity factors.

Example 18 is the method of example 17, wherein determining the plurality of priorities corresponding to the plurality of services comprises: determining a plurality of service types of the services; and determining the priorities in view of the service types.

Example 19 is the method of example 18, wherein the service types comprise at least one of a web server, a database server, or a middleware server.

Example 20 is the method of example 17, wherein determining the plurality of priorities corresponding to the plurality of services comprises: determining the plurality of priorities in view of a plurality of users associated with the plurality of services.

Example 21 is the method of example 17, wherein determining the plurality of service capacity factors comprises: determining a first number of replicas of a first service running on the node; determining a second number of replicas of the first service running on a plurality of nodes of the computer system; and determining, in view of the first number and the second number, a first service capacity factor of the plurality of service capacity factors.

Example 22 is the method of example 17, wherein determining, in view of the first number and the second number, the first service capacity factor comprises determining a ratio of the first number to the second number.

Example 23 is the method of example aim 17, wherein determining the lost impact factor in view of the plurality of service capacity factors comprises: determining a combination of the plurality of service capacity factors.

Example 24 is the method of example 23, wherein the combination of the plurality of service capacity factors comprises an absolute sum of the plurality of service capacity factors.

Example 25 is the method of example 23, wherein the combination of the plurality of service capacity factors comprises a weighted sum of the plurality of service capacity factors.

Example 26 is the method of example 25, wherein determining the lost impact factor in view of the plurality of service capacity factors further comprises: assigning a plurality of weights to the plurality of service capacity factors in view of the plurality of priorities; and determining the combination of the plurality service capacity factors in view of the plurality of weights.

Example 27 is a method, comprising: determining that an application is to be deployed in a computer system; determining, by a processing device, a plurality of lost impact factors corresponding to a plurality of nodes of the computer system; selecting, in view of the plurality of lost impact factors, a first node of the plurality of nodes; and deploying the application on the first node.

Example 28 is the method of example 27, wherein selecting, in view of the plurality of lost impact factors, the first node of the plurality of nodes comprises: determining that a first lost impact factor corresponding to the first node is not greater than at least one other lost impact factor of the plurality of lost impact factors.

Example 29 is the method of example 28, wherein determining the first lost impact factor comprises: identifying one or more applications running on the first node; and determining, a plurality of service capacity factors corresponding to each of the identified applications, wherein each of the service capacity factors represents an amount of service loss of one of the identified applications resulted from a loss of one of the first node.

Example 30 is the method of example 29, wherein determining the first lost impact factor in view of the plurality of service capacity factors comprises determining a combination of the plurality of service capacity factors.

Example 31 is the method of example 29, wherein determining the plurality of service capacity factors comprises: determining a first number of replicas of a first application running on the first node; determining a second number of replicas of the first application running on the plurality of nodes; and determining, in view of the first number and the second number, a first service capacity factor corresponding to the first application.

Example 32 is the method of example 29, wherein determining, in view of the first number and the second number, the first service capacity factor corresponding to the first application comprises: determining a ratio of the first number to the second number.

Example 33 is an apparatus comprising: means for determining that a service replica is to be deployed in a computer system; means for determining a plurality of lost impact factors corresponding to a plurality of nodes of the computer system; means for selecting, in view of the plurality of lost impact factors, a first node of the plurality of nodes; and means for deploying the service replica on the first node.

Example 34 is the apparatus of example 33, further comprising the subject matter of any of examples 1-32.

Example 35 is a system comprising a memory and a processing device operatively coupled to the memory, the processing device to implement the method of any of examples 1-32.

Example 36 is a non-transitory machine-readable storage medium including instructions that, when accessed by a processing device, cause the processing device to implement the method of any of examples 1-32.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "creating," "assigning," "providing," "executing," "determining," "copying," "storing," "identifying," "gathering," "allocating," "associating," "identifying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
identifying a plurality of services running on a node of a plurality of nodes of a computer system;
determining a plurality of priorities corresponding to the plurality of services;
determining, by a processing device, a plurality of service capacity factors for the plurality of services in view of the plurality of priorities, wherein each service capacity factor represents an amount of loss of capacity of a corresponding service associated with a loss of the node;
determining, by the processing device, a lost impact factor in view of the plurality of service capacity factors; and
deploying, based on the lost impact factor, a service of the plurality of services on one or more nodes of the plurality of nodes to minimize an amount of service loss associated with a loss of the one or more nodes.

2. The method of claim 1, wherein determining the plurality of priorities corresponding to the plurality of services comprises: determining a plurality of service types of the services; and determining the priorities in view of the service types.

3. The method of claim 2, wherein the service types comprise at least one of a web server, a database server, or a middleware server.

4. The method of claim 1, wherein determining the plurality of priorities corresponding to the plurality of services comprises: determining the plurality of priorities in view of a plurality of users associated with the plurality of services.

5. The method of claim 1, wherein determining the plurality of service capacity factors comprises:
determining a first number of replicas of a first service running on the node;
determining a second number representative of a total number of replicas of the first service running on the computer system; and
determining, in view of the first number and the second number, a first service capacity factor of the plurality of service capacity factors.

6. The method of claim 5, wherein determining, in view of the first number and the second number, the first service capacity factor comprises determining a ratio of the first number to the second number.

7. The method of claim 1, wherein determining the lost impact factor in view of the plurality of service capacity factors comprises: determining a combination of the plurality of service capacity factors.

8. The method of claim 7, wherein the combination of the plurality of service capacity factors comprises an absolute sum of the plurality of service capacity factors.

9. The method of claim 7, wherein the combination of the plurality of service capacity factors comprises a weighted sum of the plurality of service capacity factors.

10. The method of claim 9, wherein determining the lost impact factor in view of the plurality of service capacity factors further comprises:
assigning a plurality of weights to the plurality of service capacity factors in view of the plurality of priorities; and
determining the combination of the plurality of service capacity factors in view of the plurality of weights.

11. A system comprising:
a memory;
a processing device operatively coupled to the memory, the processing device to:
identify a plurality of services running on a node of a plurality of nodes of a computer system;
determine a plurality of priorities corresponding to the plurality of services;
determine a plurality of service capacity factors for the plurality of services in view of the plurality of priorities, wherein each service capacity factor represents an amount of loss of capacity of a corresponding service associated with a loss of the node;
determine a lost impact factor in view of the plurality of service capacity factors; and
deploy, based on the lost impact factor, a service of the plurality of services on one or more nodes of the plurality of nodes to minimize an amount of service loss associated with a loss of the one or more nodes.

12. The system of claim 11, wherein the processing device to determine the plurality of priorities further comprises the processing device to:
determine a plurality of service types of the services; and
determine the priorities in view of the service types.

13. The system of claim 12, wherein the service types comprise at least one of a web server, a database server, or a middleware server.

14. The system of claim 11, wherein the processing device to determine the plurality of priorities further comprises the processing device to determine the plurality of priorities in view of a plurality of users associated with the plurality of services.

15. The system of claim 11, wherein the processing device to determining the plurality of service capacity factors further comprises the processing device to:
determine a first number of replicas of a first service running on the node;
determine a second number representative of a total number of replicas of the first service running on the computer system; and
determine, in view of the first number and the second number, a first service capacity factor of the plurality of service capacity factors.

16. The system of claim 15, wherein the processing device to determine, in view of the first number and the second number, the first service capacity factor comprises the processing device to determine a ratio of the first number to the second number.

17. A non-transitory machine-readable storage medium including instructions that, when accessed by a processing device, cause the processing device to:
identify a plurality of services running on a node of a plurality of nodes of a computer system;
determine a plurality of priorities corresponding to the plurality of services;
determine a plurality of service capacity factors for the plurality of services in view of the plurality of priorities, wherein each service capacity factor represents an amount of loss of capacity of a corresponding service associated with a loss of the node;
determine a lost impact factor in view of the plurality of service capacity factors; and
deploy, based on the lost impact factor, a service of the plurality of services on one or more nodes of the plurality of nodes to minimize an amount of service loss associated with a loss of the one or more nodes.

18. The non-transitory machine-readable storage medium of claim 17, wherein the processing device to determine the plurality of priorities corresponding to the plurality of services further comprises the processing device to:
  determine a plurality of service types of the services; and
  determine the priorities in view of the service types.

19. The non-transitory machine-readable storage medium of claim 17, wherein the processing device to determine the plurality of priorities corresponding to the plurality of services further comprises the processing device to determine the plurality of priorities in view of a plurality of users associated with the plurality of services.

20. The non-transitory machine-readable storage medium of claim 17, wherein the processing device to determine the plurality of service capacity factors further comprises the processing device to:
  determine a first number of replicas of a first service running on the node;
  determine a second number representative of a total number of replicas of the first service running on the computer system; and
  determine, in view of the first number and the second number, a first service capacity factor of the plurality of service capacity factors.

* * * * *